(12) United States Patent
Mitchell

(10) Patent No.: US 10,294,810 B2
(45) Date of Patent: May 21, 2019

(54) HEAT EXCHANGER SEAL SEGMENT FOR A GAS TURBINE ENGINE

(71) Applicant: ROLLS-ROYCE plc, London (GB)

(72) Inventor: Mark T Mitchell, Bristol (GB)

(73) Assignee: ROLLS-ROYCE plc, London (GB)

( * ) Notice: Subject to any disclaimer, the term of this patent is extended or adjusted under 35 U.S.C. 154(b) by 513 days.

(21) Appl. No.: 15/134,723

(22) Filed: Apr. 21, 2016

(65) Prior Publication Data

US 2016/0341060 A1    Nov. 24, 2016

(30) Foreign Application Priority Data

May 19, 2015  (GB) .................................. 1508551.7

(51) Int. Cl.
| | | |
|---|---|---|
| *F01D 11/08* | (2006.01) | |
| *F16J 15/16* | (2006.01) | |
| *F01D 9/04* | (2006.01) | |
| *F01D 11/14* | (2006.01) | |

(52) U.S. Cl.
CPC ............. *F01D 11/08* (2013.01); *F01D 9/04* (2013.01); *F01D 11/14* (2013.01); *F16J 15/162* (2013.01); *F05D 2220/32* (2013.01); *F05D 2240/11* (2013.01); *F05D 2240/55* (2013.01); *F05D 2260/213* (2013.01); *F05D 2260/221* (2013.01)

(58) Field of Classification Search
CPC . F01D 25/24; F01D 11/08; F01D 9/04; F01D 25/12; F01D 11/24
See application file for complete search history.

(56) References Cited

U.S. PATENT DOCUMENTS

| 4,526,226 A * | 7/1985 | Hsia .................. F01D 5/187 |
| | | 165/109.1 |
| 4,573,865 A * | 3/1986 | Hsia .................. F01D 5/187 |
| | | 165/109.1 |
| 5,486,090 A | 1/1996 | Thompson et al. |
| 5,609,469 A | 3/1997 | Worley et al. |
| 7,517,189 B2 * | 4/2009 | Camus ................ F01D 9/04 |
| | | 415/173.1 |

(Continued)

FOREIGN PATENT DOCUMENTS

| EP | 2 851 517 A1 | 3/2015 |
| EP | 2 860 359 A1 | 4/2015 |
| EP | 2 886 809 A1 | 6/2015 |

OTHER PUBLICATIONS

Sep. 9, 2016 Search Report issued in European Patent Application No. 16 16 6412.

(Continued)

*Primary Examiner* — Jason D Shanske
*Assistant Examiner* — John S Hunter, Jr.
(74) *Attorney, Agent, or Firm* — Oliff PLC

(57) ABSTRACT

Described is a seal segment (310) for a gas turbine engine, comprising: a gas facing wall (312) having a gas facing surface (314) and a first internal surface (316); an outboard wall (318) having an outboard facing surface (320) and a second internal surface (322) which is radially separated from the first internal surface with a gap therebetween; a first conduit (324) located between the first and second internal surfaces; and, a second conduit (326) located between the first and second internal surfaces, wherein the first and second conduits are radially separated by a party wall (328).

15 Claims, 2 Drawing Sheets

(56) References Cited

U.S. PATENT DOCUMENTS

| | | |
|---|---|---|
| 8,777,559 B2 | 7/2014 | Koyabu et al. |
| 2007/0041827 A1 | 2/2007 | Camus |
| 2013/0108419 A1 | 5/2013 | Brunelli et al. |

OTHER PUBLICATIONS

Nov. 11, 2015 Search Report issued in British Patent Application No. 1508551.7.

* cited by examiner

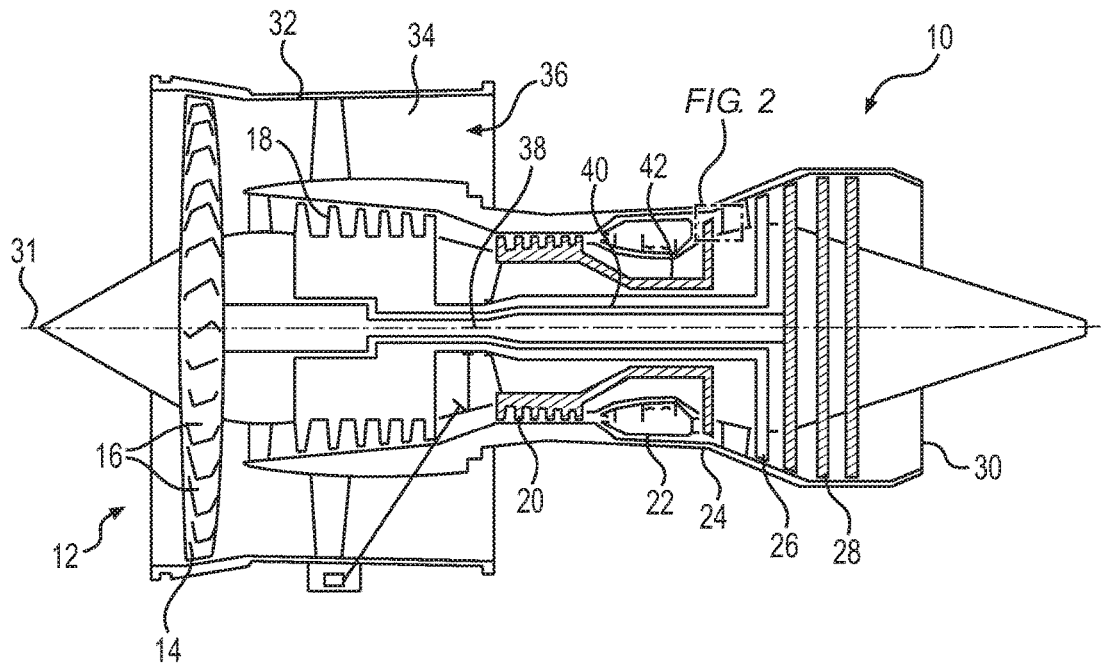
FIG. 1
CONVENTIONAL

HEAT EXCHANGER SEAL SEGMENT FOR A GAS TURBINE ENGINE

TECHNICAL FIELD OF INVENTION

This invention relates to a heat exchanger for a gas turbine engine. The heat exchanger is located within an air cooled seal segment in a turbine stage of the gas turbine.

BACKGROUND OF INVENTION

FIG. 1 shows a ducted fan gas turbine engine 10 comprising, in axial flow series: an air intake 12, a propulsive fan 14 having a plurality of fan blades 16, an intermediate pressure compressor 18, a high-pressure compressor 20, a combustor 22, a high-pressure turbine 24, an intermediate pressure turbine 26, a low-pressure turbine 28 and a core exhaust nozzle 30. The fan, compressors and turbine are all rotatable about a principal axis 31 of the engine 10. A nacelle 32 generally surrounds the engine 10 and defines the intake 12, a bypass duct 34 and a bypass exhaust nozzle 36.

Air entering the intake 12 is accelerated by the fan 14 to produce a bypass flow and a core flow. The bypass flow travels down the bypass duct 34 and exits the bypass exhaust nozzle 36 to provide the majority of the propulsive thrust produced by the engine 10. The core flow enters in axial flow series the intermediate pressure compressor 18, high pressure compressor 20 and the combustor 22, where fuel is added to the compressed air and the mixture burnt. The hot combustion products expand through and drive the high, intermediate and low-pressure turbines 24, 26, 28 before being exhausted through the nozzle 30 to provide additional propulsive thrust. The high, intermediate and low-pressure turbines 24, 26, 28 respectively drive the high and intermediate pressure compressors 20, 18 and the fan 14 by interconnecting shafts 38, 40, 42.

The performance of gas turbine engines, whether measured in terms of efficiency or specific output, is generally improved by increasing the turbine gas temperature. It is therefore desirable to operate the turbines at the highest possible temperatures. As a result, the turbines in state of the art engines, particularly high pressure turbines, operate at temperatures which are greater than the melting point of the material of the blades and vanes making some form of cooling necessary. However, increasing cooling of components generally represents a reduction in turbine efficiency and so much effort is spent in finding a satisfactory trade-off between turbine entry temperature, the life of a cooled turbine component and specific fuel consumption. This has led to a great deal of research and development of new materials and designs which can allow an efficient increase of the gas turbine entry temperature.

The present invention seeks to provide improved cooling arrangements for a gas turbine.

STATEMENTS OF INVENTION

The present invention provides a seal segment for a gas turbine engine according to the appended claims.

A seal segment for a gas turbine engine, may comprise: a gas facing wall having a gas facing surface and a first internal surface; an outboard wall having an outboard facing surface and a second internal surface which is radially separated from the first internal surface with a gap therebetween; a first conduit located between the first and second internal surfaces; and, a second conduit located between the first and second internal surfaces, wherein the first and second conduits are radially separated by a party wall.

Unless otherwise stated or apparent from the context, the use of radial and circumferential in this document are in relation to the principal axis of the machine. Upstream and downstream are in relation to the main gas path.

The second conduit may overlay the first conduit in a radial direction. The first and second conduits may be elongate and have respective longitudinal axes. A flow direction may be defined by the respective longitudinal axes of the first and second conduits. The flow directions may be aligned and have a common trajectory. The flow directions may be parallel or antiparallel.

A wall of the first conduit may be the first internal surface. A further wall of the first conduit is defined by the second internal surface. The second conduit may be partly defined by the second internal surface.

The party wall may extend around multiple sides of the second conduit. The party wall may include a plurality of sides. The sides may be in different planes. The plurality of sides may be surrounded by the first conduit. The planes may be include circumferential and radial. The party wall may include side walls. The distal ends of the side walls may be connected by a transverse wall. The transverse wall may be approximately circumferential. The side walls may be radially coterminous.

The first and second conduits may radially overlap. The second conduit may be surrounded by the first conduit on multiple sides. The geometrical centre of the flow area of the first and second conduits in lateral section may be radially displaced. The geometric centre of the first conduit may be radially proximate to the first internal surface. The geometric centre of the second conduit may be radially proximate to the second internal surface.

Either or both of the first and second conduits may have a meandering flow path. The seal segment may include upstream and downstream ends relative to the flow direction of the main gas path and circumferentially separated end faces. The flow path may include a plurality of parallel paths in flow series. The parallel paths may extend between the upstream and downstream ends. The parallel paths may be arranged in series. Each of the parallel paths may be connected by respective U bends in the flow path.

The first and second conduits may include respective inlets and outlets displaced along the length thereof, wherein the inlet of the first conduit is located proximate to the outlet of the second conduit, and the inlet of the second conduit is located local to the first conduit.

The first conduit outlet may include a plurality of exhaust holes in a circumferential edge of the seal segment.

The outlet of the second conduit may include an exhaust manifold which extends from an opening in the outboard wall towards a downstream edge of the seal segment. The outlet of the first conduit may be provided by a plurality of exhaust holes arranged along a length of the first conduit. The exhaust holes may be located towards an end thereof. The outlet(s) may be through-holes in the circumferential edge of the seal segment. The outlet of the second conduit may be provided along a downstream edge of the seal segment.

Either of the first or second conduit inlets may include a flow connector which extends from an opening in the outboard wall to a supporting wall of the seal segment in which the supporting wall attaches the seal segment to a wall of a gas turbine engine.

A gas turbine engine, may comprise: a turbine stage having a plurality of circumferentially adjacent seal segments defining a boundary wall for the main gas path, each seal segment having a seal segment for a gas turbine engine, comprising: a gas facing wall having a gas facing surface and a first internal surface; an outboard wall having an outboard facing surface and a second internal surface which is radially separated from the first internal surface with a gap therebetween; a first conduit located between the first and second internal surfaces; and, a second conduit located between the first and second internal surfaces, wherein the first and second conduits are radially separated by a party wall. Each of the first and second conduits may have an inlet and an outlet. The inlet of the first conduit may be in fluid communication with an air source having a first temperature. The second conduit may be in fluid communication with an air source having a second temperature, wherein the first is higher than the first temperature.

The gas turbine engine includes a compressor having a plurality of stages. The first air source may be a final stage of the compressor. The second air source may be a mid-stage of the compressor.

Within the scope of this application it is expressly envisaged that the various aspects, examples and alternatives, and in particular the individual features thereof, set out in the preceding paragraphs, in the claims and/or in the following description and drawings, may be taken independently or in any combination. For example, features described in connection with one example are potentially applicable to all unless such features are incompatible.

DESCRIPTION OF DRAWINGS

Embodiments of the invention will now be described with the aid of the following drawings of which:

FIG. 1 shows a conventional gas turbine engine in which the invention may find application.

DETAILED DESCRIPTION OF INVENTION

Figure 2:
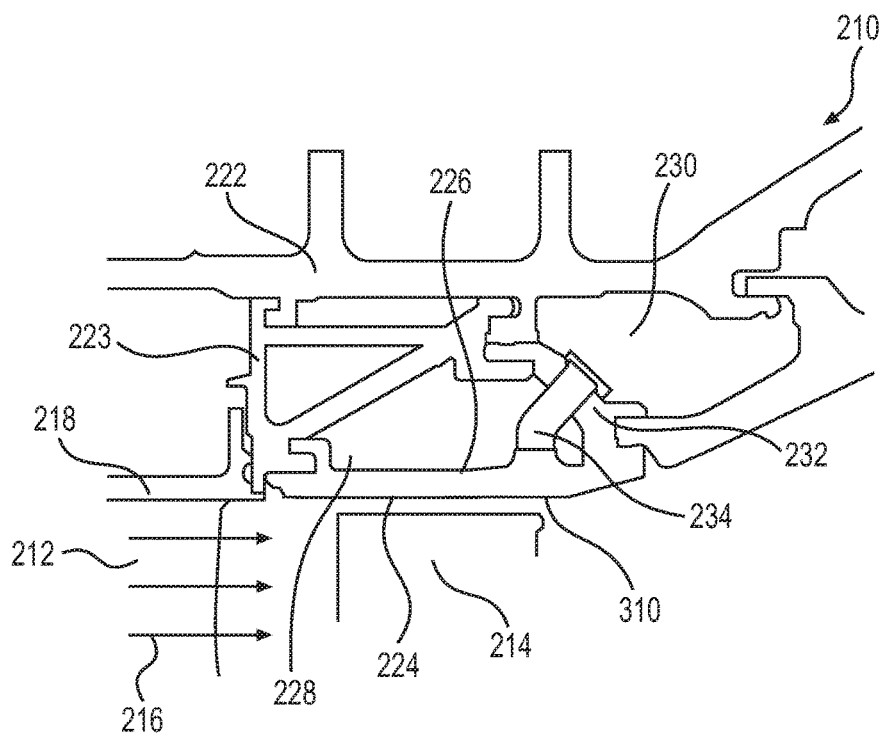
FIG. 2 shows a streamwise partial section of a high pressure turbine.

FIG. 2 shows a streamwise partial section of a turbine stage 210 of a gas turbine engine which can be located within the architecture of a substantially conventional gas turbine at a location as highlighted in FIG. 1. The arrangement includes an upstream stator vane 212, a turbine blade 214 arranged in flow series along the main gas path 216 as is well known in the art. The vane 212 and blade 214 shown are one of a plurality of similar circumferentially displaced vanes and blades which are arranged in an annular array about the principal axis of rotation 31.

The main gas path 216 annulus is defined by inner and outer 218 radial vane platforms and inner blade platforms and seal segments 310 which are radially outboard of the turbine blade tips. The seal segments 310 are attached to the engine casing 222 via a so-called carrier 223. The seal segment 310 includes a gas washed surface 224 adjacent the main gas path 216 and an outboard side 226.

Figure 3:
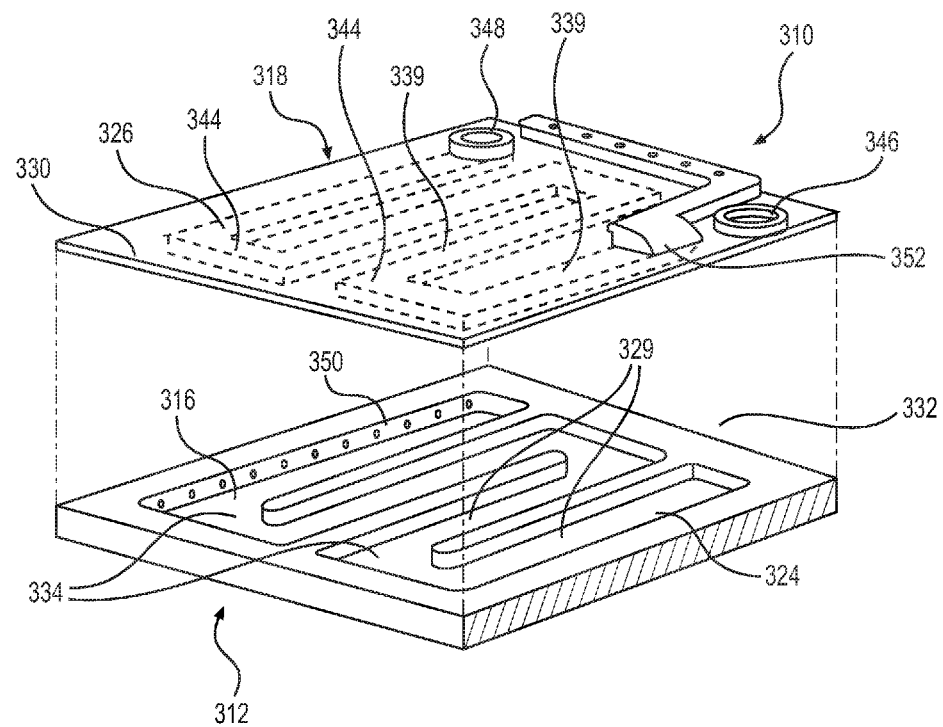
FIG. 3 shows an exploded view of a heat exchanger seal segment.
Figure 4:
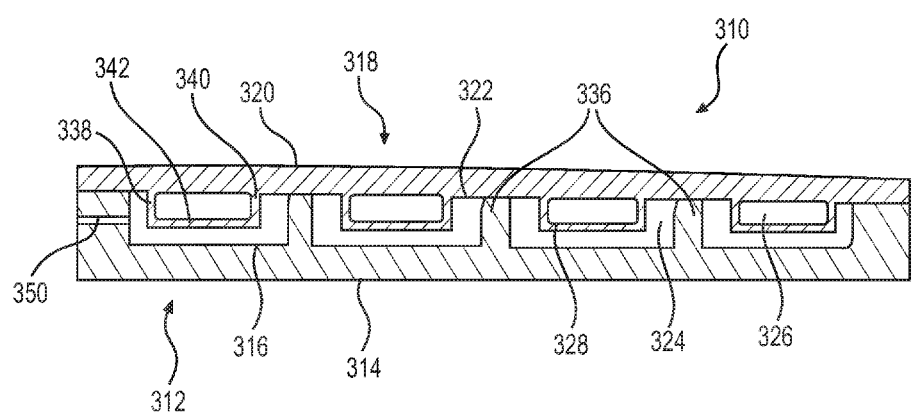
FIG. 4 shows a lateral section of the heat exchanger of FIG. 3.

FIGS. 3 and 4 show respectively exploded and sectional views of a seal segment 310 which may be utilised in the arrangement similar to that shown in FIG. 2. The exploded view of FIG. 3 has been split along an imaginary plane to show the internal arrangement of the seal segment with greater clarity. The two halves would be integrally formed or sealably attached to one another in a working embodiment.

The seal segment 310 includes a gas path wall 312 having a gas facing surface 314 and a first internal surface 316. An outboard wall 318 is provided on an opposing side to the gas path wall 312 and includes outboard facing surface 320 and a second internal surface 322 (the first being that of the gas path wall) which is radially separated from the first internal surface 316 with a gap therebetween. The space between the gas path wall 312 and outboard wall 318 includes a first conduit 324 and a second conduit 326. The first 324 and second 326 conduits are in the form of enclosed walled channels which provide a flow path for cooling air when in use. The first 324 and second 326 conduits are fluidically isolated from one another such that the respective flows do not intermix. However, the party wall 328 which separates and mutually defines the first and second conduits in part allows thermal interaction so as to provide a heat exchanger arrangement. In use, the first conduit 324 is a high temperature flow passage and the second conduit 326 is a low temperature flow passage with heat travelling from the first conduit which is adjacent to the gas washed wall of the seal segment, to the second conduit which is adjacent the outboard side of the seal segment.

The first conduit 324 is provided by a meandering pathway having a plurality of parallel paths 329 which extend between the upstream 330 and downstream 332 ends of the seal segment 310. The parallel paths 329 are in connected in flow series via u-bends 334 which connect the respective ends thereof.

It can be seen from the lateral section in FIG. 4, that the first conduit 324 radially spans the gap between the gas path wall 312 and outboard wall 318 and has conduit walls provided by the gas path wall 312, the outboard wall 318, side walls 336 and the party wall 328. The side walls extend from the first internal surface 316 and second internal surface 322. The party wall 328 is attached to the outboard wall 318 and defines a box section within the space and generally protrudes into the first conduit 324. Thus, the party wall 328 includes first 338 and second 340 side walls which append from the second internal surface 322 associated with the outboard wall 318 and extend radially towards but not to the gas path wall 312. The side walls 338, 340 are radially coterminous and joined at their distal ends (distal relative to the second surface) by a transverse wall 342 extending in a circumferential plane such that the party wall 328 includes three orthogonally arranged walls which combine with the outboard wall to define a rectangular flow section. The second conduit 326 is therefore defined by a portion of the second internal surface 322, the party wall side 338, 340 and transverse 342 walls. It will be appreciated that the side walls of the party wall may be inclined to one another in a non-orthogonal manner. Further, the party wall may be generally round, for example, semi-circular in section so as not to have discrete walls in defined planes.

The party wall 328 is symmetrical arranged about a central radially extending plane located at a mid-point between the side walls 338, 340 and aligned with circumferential centre of the first conduit 324 to provide a generally U-shaped first conduit with a uniform and similar flow path width between respective party wall 328 walls and opposing wall on each side.

It will be appreciated that the size and shape of the first and second conduits can be adapted according to the specific requirements of a given application. However, some preferable examples of the wall arrangement will have a high pressure, high temperature first conduit flow area around twice that of the low pressure, low temperature second conduit flow area. Further, either or both of the first and second conduits and party wall may include additional surface features to aid heat transfer. For example, either or both of the first and second conduits may include fins or corrugations in one or both directions. Such features increase the surface area and may channel fluid flow or induce turbulence to aid heat transfer.

Generally, the party wall 328 provides a radial separation of the first 324 and second 326 conduits such that cooling flows of different temperature can be stacked within the seal segment 310 to allow for effective surface contact and heat transfer. The example shown in FIGS. 3 and 4 provides a party wall 328 which defines a box section surrounded on three sides by the first conduit 324 air flow. However, it will be appreciated that a party wall may provide the radial separation in other ways. For example, the party wall may fully extend between the side walls 336 which radially extend between the outboard 318 and gas path walls 312. Thus, the gap which separates the external walls of the seal segment may be radially partitioned by the party wall. In other examples, the first conduit may extend over or be attached to a side wall so that only two sides of the second conduit are contacted by the first conduit.

The second conduit 326 is defined by the party wall 328 on three sides, and the internal surface 322 of the outboard wall 318 on the radially outer side. The projection of the party wall 328 into the first conduit 324, results in the second conduit 326 and first conduit 324 radially overlapping. The extent of the radial overlap will vary according to the arrangement of the party wall 328, some examples of which are provided in the preceding paragraph. However, generally, the centre of the flow area of the first conduit will be located towards the gas path wall, whilst the centre of the flow area of the second conduit will be more towards the outboard wall.

The path of the second conduit 326 is radially overlaid on the path of the first conduit so that the two conduits are in a radially stacked configuration. In the described embodiment, the overlay is for the majority of the length of the respect path lengths. Hence, the second conduit also has a meandering pathway which includes a plurality of parallel paths 339 which extend between the upstream 330 and downstream 332 ends of the seal segment 310. The parallel paths 339 are in connected in flow series via u-bends 344 which connect the respective ends thereof.

Although the flow paths of the first 324 and second 326 conduits are in geometric alignment with one another in that the longitudinal axes are generally parallel for the majority of the path lengths, the respective inlets 346, 348 and outlets 350, 352 are provided at opposite ends of the flow paths such that the cooling air in the two conduits flow in opposing or anti-parallel directions when in use.

More specifically, each of the first 324 and second conduits 326 are provided with respective inlets 346, 348 and outlets 350, 352 for the infeed and exhaust of a flow of cooling air. The first conduit 324 includes an inlet 346 which extends from the outboard external surface of the outboard wall 318 and which provides fluid communication with a first air chamber 228. The inlet 346 of the first conduit is located proximate to an outlet 352 of the second conduit 326. The inlet 348 of the second conduit 326 provides a fluid path through the outboard wall 318 of the seal segment 310 and into a connecting conduit which provides a fluid pathway with a second air chamber 230. The second conduit inlet is located proximate to an exhaust 350 of the first conduit 324.

The first 228 and second 230 air chambers are located on respective upstream and downstream sides of a support wall 232 which extends from the outboard side of the seal segment to the engine casing 222. The supporting wall 232 includes elements of the engine casing 222, carrier 223, and seal segment 232 and partitions the space on the outboard side of the seal segment.

In use, the first 228 and second 230 chambers are provided with compressed air from different sources so as to have cooling air at a first temperature (and pressure) in the first chamber, and cooling air at a second, lower temperature (and pressure) in the second chamber. The air provided in the first chamber 228 is selected according to the pressure conditions in the corresponding part of gas path associated with exhausts of the first conduit 324. In the example described here, this cooling air is taken from the final stage of a high pressure compressor which has suitable pressure for the high pressure turbine stage.

The cooling air in the second conduit 326 is provided by a second source in the form of a mid-stage of the high pressure compressor. This compressor stage is selected according to a required cooling rate whilst reducing the amount of air used in the second conduit 326.

The cooling air received from the first chamber 228 at a higher temperature and pressure passes into the first conduit 324 via the inlet 346 and travels along the meandering path towards the first conduit exhaust 350. However, the cooling air generally increases in temperature as it cools the gas washed side of the seal segment which reduces the cooling efficiency and provides a non-uniform distribution of cooling and associated thermal gradient across the component. Providing the contra-flow of a second conduit 326 cooling air at a reduced temperature allows the hottest cooling air at the first conduit exhaust 350 to be cooled by the coolest cooling air as it enters the second conduit, and vice versa. This allows the thermal gradient experienced by the seal segment to be reduced.

In the example shown in FIGS. 2, 3 and 4, the inlets 346, 348 of the first 324 and second 326 conduits are both local to the downstream edge of the seal segment 310 but upstream of the supporting wall 232. Providing the inlets 346, 348 as aft as possible allows a greater extent of the gas path wall to be cooled. The inlets 346, 348 are provided at similar axial locations relative to the principal axis of the engine which allow a greater degree of overlay between the first 324 and second 326 conduits.

To enable the second conduit inlet 352 to be in fluid communication with the second air chamber on the downstream side of the supporting wall, the seal segment includes a further portion of conduit which extends from an outboard side thereof to the partitioning wall. The further portion of conduit is in the form of a tubular flow connector which sealably passes through the supporting wall. It will be appreciated that the flow connector may be integrally formed with the supporting wall. Further, it will be understood that where the inlets are placed aft of the supporting wall 232, a similar flow connector 234 may be used to connect the first conduit to the first air chamber upstream of the supporting wall 232.

The exhaust 350 for the first conduit 324 is provided by a plurality of exhaust holes in a circumferential edge of the seal segment 310. The exhaust holes are distributed along the edge and extend along the length of one of the parallel paths 329 of the first conduit 324.

The exhaust of the second conduit 326 is provided at a downstream or trailing edge of the seal segment via an exhaust manifold 352. The exhaust manifold 352 extends from an outlet 352 at a terminal end of the second conduit 326 to the trailing edge of the seal segment 310. The outlet 352 is provided by a through-hole in the outboard wall of the seal segment. The exhaust manifold resides on an outboard exterior side of the seal segment. The exhaust manifold includes a dog-leg portion which goes around, possibly circumscribing, the inlet of the first conduit inlet which is downstream of the outlet (relative to the main gas path). Although not shown in FIG. 3, it will be appreciated that the exhaust wall passes below and through the supporting wall 232.

The seal segment 310 of the invention may be made using an additive layer process or a cast and bond process in which the two halves are made using conventional casting techniques known in the gas turbine art before being bonding together.

In use, as the engine rotates, compressed air is provided from the respective parts of the compressor to the first 228 and second 230 chambers. Air flows from the first chamber 228 to the inlet 346 of the first conduit 324 and along the meandering flow path towards the first conduit exhaust 350. The flow of cooling air interacts with the gas path wall 312 of the seal segment 312 thereby removing heat and cooling the wall. In addition, air flows from the second chamber 230 into the second conduit 326 via the flow connector 234 and inlet 348 towards the first conduit exhaust 350. The flow of cooling air in the second conduit 326 interacts with the party wall 328 to provide cooling thereto and a heat transfer with the first cooling flow. The heated air from the second cooling flow is then exhausted and either entered into the gas path or re-used to cool other components.

It will be understood that the invention is not limited to the described examples and various modifications and improvements can be made without departing from the concepts described herein and the scope of the claims. Except where mutually exclusive, any of the features may be employed separately or in combination with any other features and the disclosure extends to and includes all combinations and sub-combinations of one or more described features.

The invention claimed is:

1. A seal segment for a gas turbine engine, comprising:
    a gas facing wall having a gas facing surface and a first internal surface;
    an outboard wall having an outboard facing surface and a second internal surface which is radially separated from the first internal surface by a gap;
    a first conduit located between the first and second internal surfaces; and,
    a second conduit located between the first and second internal surfaces, wherein the first and second conduits are radially separated by a party wall that precludes airflow therebetween.

2. The seal segment as claimed in claim 1, wherein the second conduit overlays the first conduit in a radial direction.

3. The seal segment as claimed in claim 2, wherein a wall of the first conduit is the first internal surface.

4. The seal segment as claimed in claim 3, wherein a further wall of the first conduit is defined by the second internal surface.

5. The seal segment as claimed in claim 1, wherein the second conduit is defined by the second internal surface.

6. The seal segment as claimed in claim 5, wherein the party wall extends around multiple sides of the second conduit.

7. The seal segment as claimed in claim 1, wherein the first and second conduits radially overlap.

8. The seal segment as claimed in claim 1, wherein the first and second conduits have a serpentine flow path.

9. The seal segment as claimed in claim 1, wherein the first conduit includes a first inlet and a first outlet displaced along a length of the first conduit, and the second conduit includes a second inlet and a second outlet displaced along a length of the second conduit, wherein the first inlet is located proximate to the second outlet, and the second inlet is located local to the first conduit.

10. The seal segment as claimed in claim 9, wherein the first outlet includes a plurality of exhaust holes in a circumferential edge of the seal segment.

11. The seal segment as claimed in claim 9, wherein the second outlet includes an exhaust manifold which extends from an opening in the outboard wall towards a downstream edge of the seal segment.

12. The seal segment as claimed in claim 9, wherein the second inlet includes a flow connector which extends from an opening in the outboard wall to a supporting wall of the seal segment in which the supporting wall attaches the seal segment to a wall of the gas turbine engine.

13. A gas turbine engine, comprising:
    a turbine stage having a plurality of circumferentially adjacent seal segments defining a boundary wall for a main gas path, each seal segment of the plurality of circumferentially adjacent seal segments having a gas facing wall having a gas facing surface and a first internal surface;
    an outboard wall having an outboard facing surface and a second internal surface which is radially separated from the first internal surface by a gap;
    a first conduit located between the first and second internal surfaces; and
    a second conduit located between the first and second internal surfaces, wherein the first and second conduits are radially separated by a party wall, each of the first and second conduits having an inlet and an outlet, wherein
    the inlet of the first conduit is in fluid communication with a first air source having a first temperature and the second conduit is in fluid communication with a second air source having a second temperature, wherein the first temperature is greater than the second temperature.

14. The gas turbine engine as claimed in claim 13, further comprising a compressor having a plurality of stages, wherein the first air source is a final stage of the compressor.

15. The gas turbine engine as claimed in claim 14, wherein the second air source is a mid-stage of the compressor.

* * * * *